(12) United States Patent
Chen (10) Patent No.: US 10,204,576 B1
(45) Date of Patent: Feb. 12, 2019

(54) LIQUID CRYSTAL DISPLAY OF THREE TFT STRUCTURE AND DISPLAY DEVICE

(71) Applicant: Shenzhen China Star Optoelectronics Technology Co., Ltd., Shenzhen, Guangdong (CN)

(72) Inventor: Shuai Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/576,660

(22) PCT Filed: Aug. 31, 2017

(86) PCT No.: PCT/CN2017/100016
§ 371 (c)(1),
(2) Date: Nov. 22, 2017

(30) Foreign Application Priority Data

Aug. 14, 2017 (CN) .......................... 2017 1 0693057

(51) Int. Cl.
*G09G 3/36* (2006.01)

(52) U.S. Cl.
CPC ......... *G09G 3/3614* (2013.01); *G09G 3/3648* (2013.01); *G09G 3/3696* (2013.01); *G09G 2300/0426* (2013.01); *G09G 2300/0809* (2013.01); *G09G 2320/0247* (2013.01)

(58) Field of Classification Search
CPC .......... G09G 3/18; G09G 3/36–3/3696; G09G 2300/08–2300/0895; G09G 2300/0478–2300/0495
See application file for complete search history.

(56) References Cited

U.S. PATENT DOCUMENTS

| | | | |
|---|---|---|---|
| 2010/0007594 A1* | 1/2010 | Lai | G02F 1/136213 345/98 |
| 2011/0090190 A1* | 4/2011 | Lin | G09G 3/3648 345/205 |
| 2012/0154365 A1* | 6/2012 | Yamauchi | G09G 3/3659 345/211 |

* cited by examiner

*Primary Examiner* — Sanghyuk Park
(74) *Attorney, Agent, or Firm* — Andrew C. Cheng (57) ABSTRACT

A liquid crystal display of a three TFT structure includes arrayed pixel units, a data drive chip, a row drive chip, a timing controller, and a discharge module. The discharge module includes control terminals and voltage output terminals. The control terminals of the discharge module are respectively connected to control terminals of the timing controller. The first pixel unit includes three TFTs, a first liquid crystal display unit, and a second liquid crystal display unit. The three TFTs include a main TFT, a sub TFT, and a shared TFT. The voltage output terminal of the discharge module supplies a first discharge voltage when the first pixel unit is in the state of positive polarity driving and supplies a second discharge voltage when the first pixel unit is in the state of negative polarity driving. The first and second discharge voltages are both greater than a voltage of the common electrode.

17 Claims, 7 Drawing Sheets

LIQUID CRYSTAL DISPLAY OF THREE TFT STRUCTURE AND DISPLAY DEVICE

CROSS REFERENCE TO RELATED APPLICATIONS

This application claims the priority of Chinese Patent Application No. 201710693057.8 filed on Aug. 14, 2017, titled "Liquid Crystal Display of Three TFT Structure and Display Device", the disclosure of which is incorporated herein by reference in its entirety.

BACKGROUND OF THE INVENTION

1. Field of the Invention

The present invention relates to the field of display technology, and more particularly to a liquid crystal display of three thin-film transistor (TFT) structure and a display device.

2. The Related Arts

To improve displaying performance of a liquid crystal display at a large view angle, a three thin-film transistor (TFT) structure is often adopted in the known liquid crystal displays. The three TFT structure is abbreviated as "3T structure". The 3T structure comprises two display domains, which are a main domain and a sub domain. Three TFTs that are involved in the 3T structure are a main TFT, a sub TFT, and a shared TFT. The principle of operation of the 3T structure is as follows. When a gate line is turned on, a data line electrically charges liquid crystal molecules contained in the main domain and liquid crystal molecules contained in the sub domain by way of the main TFT and the sub TFT respectively, and at the same time, the shared TFT allows the liquid crystal molecules of the sub domain to discharge. In this way, a pixel voltage of the main domain and a pixel voltage of the sub domain are made different so as to realize different angles of rotation of the liquid crystal molecules to achieve compensation of color shift at a large view angle.

Under different pixel voltages, liquid crystal capacitance is different. The large the pixel voltage is, the greater the liquid crystal capacitance would be. Due to capacitance coupling, a voltage drop is present between the pixel voltage and an actual driving voltage, where the pixel voltage is less than the actual driving voltage. Further, for different gray levels, the pixel voltage has different voltage drops. In the 3T structure, only one single driving voltage is provided for the same gray level and common voltages of the main domain and the sub domain are identical. However, in an actual situation, the pixel voltages of the main domain and the sub domain are different and this leads to flickering of a display image.

SUMMARY OF THE INVENTION

In view of the above, the present invention provides a liquid crystal display of a three thin-film transistor structure and a display device, which helps lower flickering of an image and improves displaying performance.

The present invention provides, in a first aspect, a liquid crystal display of a three TFT structure, which comprises arrayed pixel units, a data drive chip, a row drive chip, a timing controller, and a discharge module, the discharge module comprising a plurality of control terminals and a plurality of voltage output terminals, the plurality of control terminals of the discharge module being respectively connected to a plurality of control terminals of the timing controller;

wherein the first pixel unit comprises three TFTs, a first liquid crystal display unit, and a second liquid crystal display unit, the three TFTs including a main TFT, a sub TFT, and a shared TFT, the main TFT corresponding to the first liquid crystal display unit, the sub TFT corresponding to the second liquid crystal display unit; the first pixel unit is one of the pixel units included in the arrayed pixel units;

wherein a gate line of the row drive chip is connected to a gate electrode of the main TFT, a gate electrode of the sub TFT, and a gate electrode of the shared TFT; a data line of the data drive chip is connected to a source electrode of the main TFT and a source electrode of the sub TFT; a drain electrode of the main TFT is connected to a first terminal of the first liquid crystal display unit; a drain electrode of the sub TFT is connected to a first terminal of the second liquid crystal display unit; a second terminal of the first liquid crystal display unit and a second terminal of the second liquid crystal display unit are connected to a common electrode; a source electrode of the shared TFT is connected to the first terminal of the second liquid crystal display unit; a drain electrode of the shared TFT is connected to one voltage output terminal of the discharge module;

wherein the row drive chip is operable to turn on, via the gate line, the main TFT, the sub TFT, and the shared TFT; the data drive chip is operable to charge, via the data line, the first liquid crystal display unit corresponding to the main TFT and the second liquid crystal display unit corresponding to the sub TFT when the main TFT and the sub TFT are turned on; and when the shared TFT is turned on, the shared TFT allows the second liquid crystal display unit to discharge by means of the discharge module; and wherein the voltage output terminal of the discharge module supplies a first discharge voltage when the first pixel unit is in a state of positive polarity driving and supplies a second discharge voltage when the first pixel unit is in a state of negative polarity driving; the first discharge voltage and the second discharge voltage are both greater than a voltage of the common electrode In the above display module terminal cleansing device, the wiper assembly is operable in combination with a cleansing solvent to remove the foreign substances remaining on the terminal area.

The present invention provides, in a second aspect, a liquid crystal display of a three TFT structure, which comprises arrayed pixel units, a data drive chip, a row drive chip, a timing controller, a first discharge module, and a second discharge module;

wherein the first pixel unit comprises a first group of three TFTs, a first liquid crystal display unit, and a second liquid crystal display unit, the first group of three TFTs including a first main TFT, a first sub TFT, and a first shared TFT, the first main TFT corresponding to the first liquid crystal display unit, the first sub TFT corresponding to the second liquid crystal display unit; the first pixel unit is one of the pixel units included in the arrayed pixel units and following a first way of variation of driving polarity;

wherein the second pixel unit comprises a second group of three TFTs, a third liquid crystal display unit, and a fourth liquid crystal display unit, the second group of three TFTs including a second main TFT, a second sub TFT, and a second shared TFT, the second main TFT corresponding to the third liquid crystal display unit, the second sub TFT corresponding to the fourth liquid crystal display unit; the second pixel unit is one of the pixel units included in the arrayed pixel units and following a second way of variation of driving polarity;

wherein a first gate line of the row drive chip is connected to a gate electrode of the first main TFT, a gate electrode of the first sub TFT, and a gate electrode of the first shared TFT; a first data line of the data drive chip is connected to a source electrode of the first main TFT and a source electrode of the first sub TFT; a drain electrode of the first main TFT is connected to a first terminal of the first liquid crystal display unit; a drain electrode of the first sub TFT is connected to a first terminal of the second liquid crystal display unit; a second terminal of the first liquid crystal display unit and a second terminal of the second liquid crystal display unit are connected to a common electrode; a source electrode of the first shared TFT is connected to the first terminal of the second liquid crystal display unit; a drain electrode of the first shared TFT is connected to one voltage output terminal of the first discharge module;

wherein a second gate line of the row drive chip is connected to a gate electrode of the second main TFT, a gate electrode of the second sub TFT, and a gate electrode of the second shared TFT; a second data line of the data drive chip is connected to a source electrode of the second main TFT and a source electrode of the second sub TFT; a drain electrode of the second main TFT is connected to a first terminal of the third liquid crystal display unit; a drain electrode of the second sub TFT is connected to a first terminal of the fourth liquid crystal display unit; a second terminal of the third liquid crystal display unit and a second terminal of the fourth liquid crystal display unit are connected to the common electrode; a source electrode of the second shared TFT is connected to the first terminal of the fourth liquid crystal display unit; a drain electrode of the second shared TFT is connected to the voltage output terminal of the second discharge module;

wherein the row drive chip is operable to turn on, via the first gate line, the first main TFT, the first sub TFT, and the first shared TFT; the data drive chip is operable to charge, via the first data line, the first liquid crystal display unit corresponding to the first main TFT and the second liquid crystal display unit corresponding to the first sub TFT when the first main TFT and the first sub TFT are turned on; when the first shared TFT is turned on, the first shared TFT allows the second liquid crystal display unit to discharge by means of the first discharge module;

wherein the row drive chip is operable to turn on, via the second gate line, the second main TFT, the second sub TFT, and the second shared TFT; the data drive chip is operable to charge, via the second data line, the third liquid crystal display unit corresponding to the second main TFT and the fourth liquid crystal display unit corresponding to the second sub TFT when the second main TFT and the second sub TFT are turned on; when the second shared TFT is turned on, the second shared TFT allows the fourth liquid crystal display unit to discharge by means of the second discharge module;

wherein the voltage output terminal of the first discharge module supplies a first discharge voltage when the first pixel unit is in a state of positive polarity driving and supplies a second discharge voltage when the first pixel unit is in a state of negative polarity driving; the first discharge voltage and the second discharge voltage are both greater than the common electrode voltage;

wherein the voltage output terminal of the second discharge module supplies the first discharge voltage when the second pixel unit is in a state of positive polarity driving and supplies the second discharge voltage when the second pixel unit is in a state of negative polarity driving.

The liquid crystal display of the three TFT structure of the embodiments of the present invention helps lower flickering of an image and improves displaying performance of the liquid crystal display.

The present invention also provides, in a third aspect, a display device, which comprises the liquid crystal display of the three TFT structure according to the first aspect of the present invention or the second aspect of the present invention.

BRIEF DESCRIPTION OF THE DRAWINGS

To more clearly explain the technical solution proposed in an embodiment of the present invention and that of the prior art, a brief description of the drawings that are necessary for describing the embodiment or the prior art is given as follows. It is obvious that the drawings that will be described below show only some embodiments of this application. For those having ordinary skills of the art, other obvious variations may be readily available from these attached drawings without the expense of creative effort and endeavor.

DETAILED DESCRIPTION OF THE PREFERRED EMBODIMENTS

A clear and complete description will be given to technical solutions provided in embodiments of the present invention, with reference being had to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

In the description of the present invention, it should be noted that unless specifically required and set, the terms "installation", "connection", and "jointing" as used herein should be interpreted in a broad way, such as being fixedly connected or removably connected, or integrally connected; or being mechanically connected; or being directly connected, or indirectly connected with intervening media therebetween, or interiors of two elements being in communication with each other. For those having ordinary skills in the art, the specific meaning of these terms used in the present invention can be appreciated for any actual situations.

Further, in the description of the present invention, unless stated otherwise, "multiple" means two or more than two. Terms related to "operations", if used in this specification, should mean independent operations and for cases where distinction from other operations is not clear, any operation that achieves a desired effect of the operation is included in the terms so used. Further, the symbol "–" as used in this specification stands for a numeral range, which comprises a range of which the minimum and the maximum are respectively the figures placed in front of and behind the symbol "–". In the drawings, units having similar or the same structure are designated with the same reference numerals.

Embodiments of the present invention provide a liquid crystal display of a three thin-film transistor structure and a display device, which help reduce flickering of an image and improve displaying performance. A detailed description is provided below.

Figure 1:
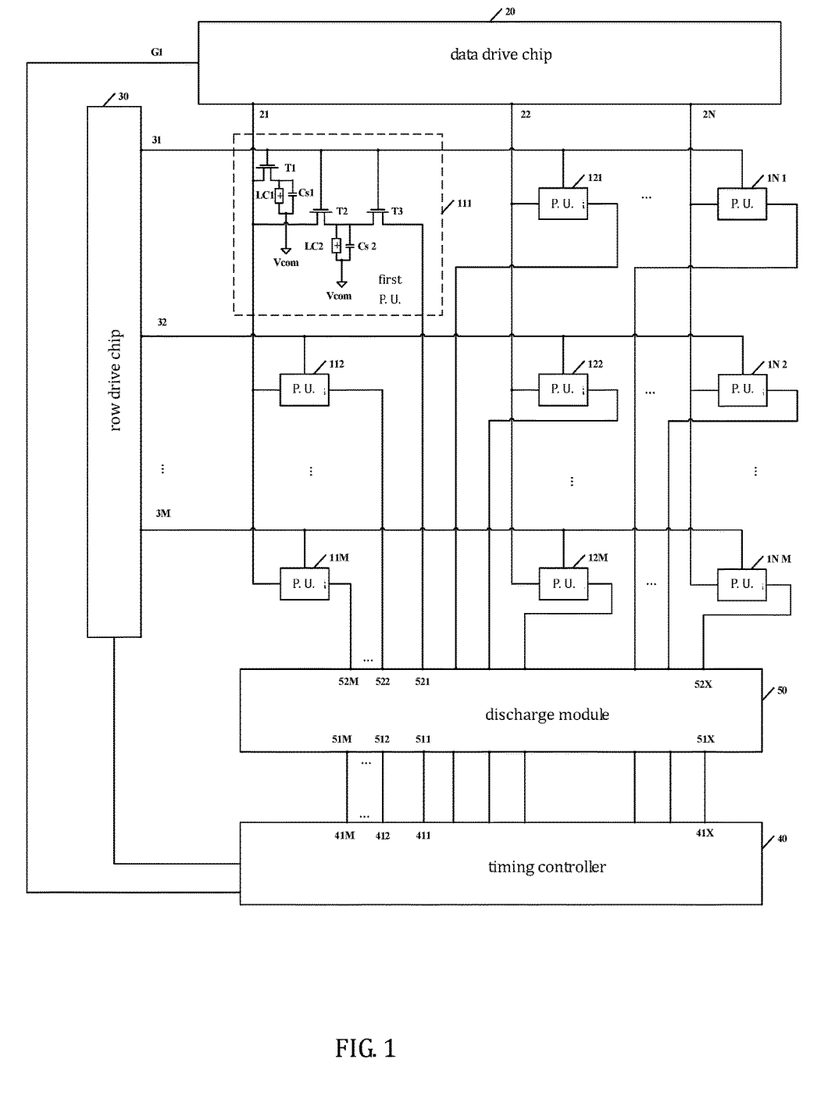
FIG. 1 is a schematic view illustrating a structure of a liquid crystal display of a three thin-film transistor structure disclosed in an embodiment of the present invention.

Referring to FIG. 1, FIG. 1 is a schematic view illustrating a structure of a liquid crystal display of a three TFT structure disclosed in an embodiment of the present invention. As shown in FIG. 1, the liquid crystal display of a three TFT structure as described in the instant embodiment comprises arrayed pixel units, a data drive chip 20, a row drive chip 30, a timing controller 40, and a discharge module 50. The discharge module 50 comprises a plurality of control terminals (such as 511, 512, . . . , 51X shown in FIG. 1) and a plurality of voltage output terminals (such as 521, 522, . . . , 52X shown in FIG. 1). The plurality of control terminals of the discharge module 50 are respectively connected to a plurality of control terminals of the timing controller 40 (such as 411, 412, . . . , 41X shown in FIG. 1).

The arrayed pixel units comprise a plurality of pixel units arranged in an array, as shown in FIG. 1. The arrayed pixel units comprises M rows and N columns (for example, M being 768 and N being 1024), and in total M×N pixel units, such as 111, 112, 113, . . . , 11M, 121, 122, 123, . . . , 12M, . . . 1N1, 1N2, 1N3, . . . , 1NM shown in FIG. 1, are involved. The pixel units of the arrayed pixel units all have the same structure and, in the following, the first pixel unit 111 is taken as an example for illustration. The first pixel unit 111 comprises three thin-film transistors (TFTs), a first liquid crystal display unit LC1, and a second liquid crystal display unit LC2. The three TFTs include a main TFT (T1), a sub TFT (T2), and a shared TFT (T3). The main TFT (T1) corresponds to the first liquid crystal display unit LC1 and the sub TFT (T2) corresponds to the second liquid crystal display unit LC2. The first pixel unit 111 is or can be regarded as any one of the pixel units included in the arrayed pixel units.

The first pixel unit 111 corresponds to one of the voltage output terminals of the discharge module 50. The arrayed pixel units comprise M×N pixel units and the M×N pixel units respectively correspond to the plurality of voltage output terminals of the discharge module 50 in a one to one manner. X=M×N. As shown in FIG. 1, the first pixel unit 111 corresponds to the voltage output terminal 521 of the discharge module 50; the second pixel unit 102 corresponds to the voltage output terminal 522 of the discharge module 50; . . . ; and the Xth pixel unit 102 corresponds to the voltage output terminal 52X of the discharge module 50.

Figure 2:
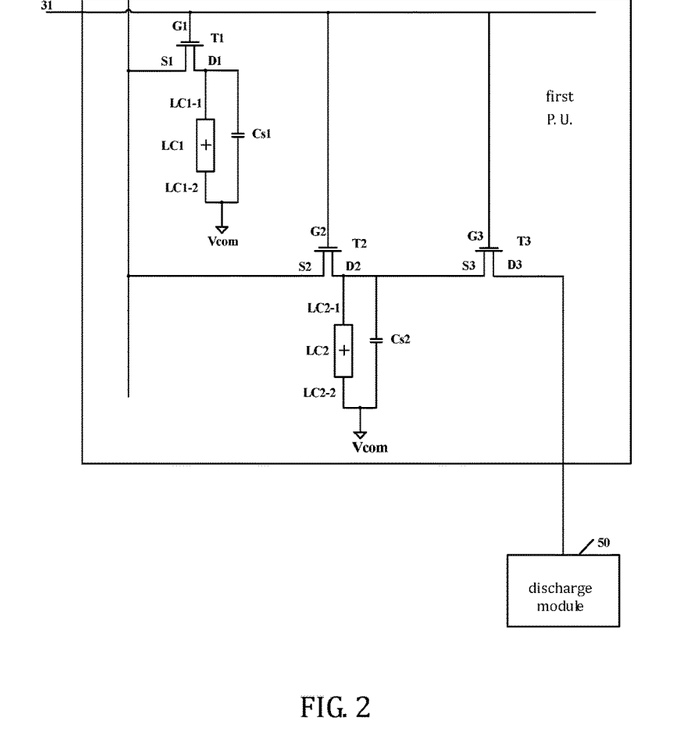
FIG. 2 is a schematic view illustrating a specific structure of a pixel unit disclosed in an embodiment of the present invention.

FIG. 2 is a schematic view illustrating a specific structure of the pixel unit disclosed in the embodiment of the present invention, and the first pixel unit shown in FIG. 1 is taken as an example of expounding the specific structure of pixel unit shown in FIG. 2. As shown in FIG. 2, a gate line 31 of the row drive chip 30 is connected to a gate electrode G1 of the main TFT (T1), a gate electrode G2 of the sub TFT (T2), and a gate electrode G3 of the shared TFT (T3); a data line 21 of the data drive chip 20 is connected to a source electrode S1 of the main TFT (T1) and a source electrode S2 of the sub TFT (T2). A drain electrode D1 of the main TFT (T1) is connected to a first terminal LC1-1 of the first liquid crystal display unit LC1, and the first terminal LC1-1 of the first liquid crystal display unit LC1 serves as a first pixel electrode; and a drain electrode D2 of the sub TFT (T2) is connected to the first terminal LC2-1 of the second liquid crystal display unit LC2 and the first terminal LC2-1 of the second liquid crystal display unit LC2 serves as a second pixel electrode. A second terminal LC1-2 of the first liquid crystal display unit LC1 and a second terminal LC2-2 of the second liquid crystal display unit LC2 are connected to a common electrode, wherein a voltage of the common electrode is referred to as a common electrode voltage (Vcom), which is also referred to as "common voltage". A source electrode S3 of the shared TFT (T3) is connected to the first terminal LC2-1 of the second liquid crystal display unit LC2, and a drain electrode D3 of the shared TFT (T3) is connected to the voltage output terminal 521 of the discharge module 50. The first liquid crystal display unit LC1 and the second liquid crystal display unit LC2 can each be regarded as "liquid crystal molecules", and applying a voltage to two ends of the liquid crystal molecules would form a liquid crystal capacitor. Thus, when a voltage is applied the first liquid crystal display unit LC1 and the second liquid crystal display unit LC2, the first liquid crystal display unit LC1 and the second liquid crystal display unit LC2 can be regarded as a liquid crystal capacitor. Also, the first liquid crystal display unit LC1 and the second liquid crystal display unit LC2 are connected, with two ends thereof, in parallel to a first storage capacitor Cs1 and a second storage capacitor Cs2 in order to maintain stability of voltage between two ends of the liquid crystal molecules during a time period of displaying a frame of image.

The row drive chip 30 is operable to turn on, via the gate line 31, the main TFT (T1), the sub TFT (T2), and the shared TFT (T3). The data drive chip 20 is operable to charge, via the data line 21, the first liquid crystal display unit LC1 corresponding to the main TFT (T1) and the second liquid crystal display unit LC2 corresponding to the sub TFT (T2) when the main TFT (T1) and the sub TFT (T2) are turned on. When the shared TFT (T3) is turned on, the shared TFT (T3) allows the second liquid crystal display unit LC2 to discharge by means of the discharge module 50.

The voltage output terminal 502 of the discharge module 50 supplies a first discharge voltage when the first pixel unit 111 is in a state of positive polarity driving and supplies a second discharge voltage when the first pixel unit 111 is in a state of negative polarity driving. The first discharge voltage and the second discharge voltage are both greater than the common electrode voltage Vcom.

The first pixel unit 111 being in the state of positive polarity driving indicates a voltage difference between the first terminal LC1-1 of the first liquid crystal display unit LC1 and the second terminal LC1-2 of the first liquid crystal display unit LC1 is a positive value and a voltage difference between the first terminal LC2-1 of the second liquid crystal display unit LC2 and the second terminal LC2-2 of the second liquid crystal display unit LC2 is a positive value; and the first pixel unit 111 being in a state of negative polarity driving indicates the voltage difference between the first terminal LC1-1 of the first liquid crystal display unit LC1 and the second terminal LC1-2 of the first liquid crystal display unit LC1 is a negative value and the voltage difference between the first terminal LC2-1 of the second liquid crystal display unit LC2 and the second terminal LC2-2 of the second liquid crystal display unit LC2 is a negative value.

The liquid crystal molecules must not be long set under the same voltage, otherwise characteristics of the liquid crystal molecules may vary, making them not rotating under the action of an electric field. If an image on a liquid crystal display screen is kept not varying, meaning the image is constantly displaying the same gray level, to prevent the characteristics of the liquid crystal molecules from being destructed, the voltage that is applied to a pixel electrode of a liquid crystal display (which is referred to as a pixel electrode voltage and is also referred to as "pixel voltage") is divided into two polarities, one being positive polarity and the other negative polarity. The pixel voltage being higher than the common voltage Vcom is referred as "positive polarity". The pixel voltage being lower than the common voltage (Vcom) is referred to as "negative polarity". For both positive polarity and negative polarity, there is a set of gray levels of the same brightness level corresponding thereto. Thus, when the absolute value of the voltage difference between the two ends of a liquid crystal display unit is fixed, the gray level displayed is the same for both the pixel voltage being higher and the common voltage (Vcom) being higher. However, the direction of rotation of the liquid crystal molecules in these two states are exactly opposite to each other and thus, the situation that the rotation direction of the liquid crystal molecules is always kept in the same direction and the characteristics are destructed as described above can be eliminated. In other words, when a display image is kept still, the positive and negative polarities of the pixel voltage are constantly switched to achieve an effect that the displayed image is fixed but the characteristics of the liquid crystal molecules are not destructed.

Figure 3:
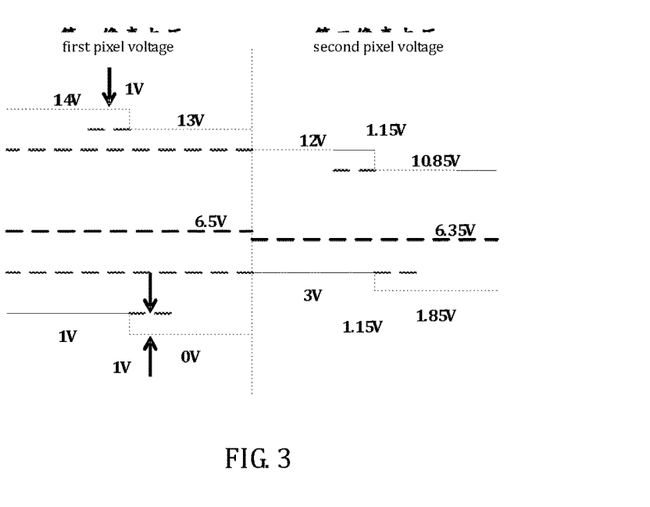
FIG. 3 is diagram illustrating variation of a pixel voltage known in the prior art.

Under different pixel voltages, the liquid crystal capacitor $C_{lc}$ is difference, and they follow the rule that the greater the pixel voltage is, the larger the liquid crystal capacitor would be. Under this condition, due to capacitance coupling, the common voltage of the liquid crystal molecules at different gray levels would be inconsistent. Capacitance coupling is also referred to as feed through effect, and the capacitance coupling formula may refer to $\Delta V = (V_{off} - V_{on}) \cdot C_{gs}/(C_{gs} + C_{st} + C_{lc})$, wherein $V_{off}$ and $V_{on}$ are ON voltage and Off voltage supplied in a data line of the data drive chip 20; $C_{gs}$ indicate parasitic capacitance of a TFT device; $C_{st}$ is storage capacitance; and $C_{lc}$ is liquid crystal capacitance, the liquid crystal capacitance being a variable associated with an image gray level. With the grey level dropping, the pixel voltage decreases; the liquid crystal capacitance reduces; and $\Delta V$ ($\Delta V$ being a difference between a driving voltage and the pixel voltage) increases. An example is provided below to illustrate such a rule of variation. Referring to FIG. 3, FIG. 3 is a diagram illustrating variation of a pixel voltage known in the prior art. As shown in FIG. 3, under a specific gray level, the timing controller 40 controls the data line 21 of the data drive chip 20 to supply a driving voltage to the first pixel unit 111. Assuming the driving voltage (the driving voltage being a voltage supplied from the data line 21 of the data drive chip 20) is 14V in a positive half cycle (that causes positive polarity driving) and is 1V in a negative half cycle (that causes negative polarity driving), due to influence caused by capacitance coupling, the voltage that the data line 21 of the data drive chip 20 supplies to the first pixel electrode (the voltage of the first pixel electrode, which is referred to as "first pixel voltage) would be pulled down to 13V ($\Delta V=1V$) in the positive half cycle and 0V ($\Delta V=1V$) in the negative half cycle. Under such a condition, the first liquid crystal display unit must be provided with a common voltage of 6.5V to meet the requirement of no flickering of the image. In the 3T structure, when the driving voltage (14V) is supplied to the second pixel electrode, the sub TFT allows the second liquid crystal display unit to be charged and meanwhile, the shared TFT allows the second liquid crystal display unit to discharge. (It is noted here that discharging the second liquid crystal display unit through the shared TFT is such that the second pixel electrode is connected to the voltage output terminal of the discharge module 50, where a voltage supplied from the voltage output terminal of the discharge module 50 is a common voltage of 6.5V.) With the capacitance coupling being disregarded, an actual value of the driving voltage applied to the second pixel electrode is 12V in the positive half cycle (this being positive polarity driving) and 3V in the negative half cycle (this being negative polarity driving). Under this condition, the first pixel electrode is in a high grey level (14V), while the second pixel electrode is in a low grey level (12V). Considering the influence of the capacitance coupling, with the grey level lowering, the pixel voltage decreases; the liquid crystal capacitance reduces; and $\Delta V$ increases, and thus, assuming the voltage of the second pixel electrode (the voltage of the second pixel electrode being referred to as "second pixel voltage") would be pulled down to 10.85V ($\Delta V=1.15V$) in the positive half cycle and 1.85V ($\Delta V=1.15V$) in the negative half cycle, then the second liquid crystal display unit must be provided with a common voltage of 6.35V to meet the requirement of no flickering of the image. Based on the above, it can be appreciated that inconsistency of common voltage can be identified between the first liquid crystal display unit and the second liquid crystal display unit, but there is just one single value of the common voltage actually provided so that situations of flickering and sticking of image may result.

The discharging rate of the second liquid crystal display unit is made greater if the voltage difference between the second pixel electrode and the voltage output terminal of the discharge module is increased; and the discharging rate of the second liquid crystal display unit is made smaller if the voltage difference between the second pixel electrode and the voltage output terminal of the discharge module is decreased. Therefore, the embodiment of the present invention is made such that during the positive polarity driving and the negative polarity driving of the first pixel unit 111, the discharge voltage supplied from the voltage output terminal 502 of the discharge module 50 is increased so that when the first pixel unit 111 is in the state of positive polarity driving, the voltage difference between the second pixel electrode of the second liquid crystal display unit and the voltage output terminal 502 of the discharge module 50 is reduced in order to reduce the discharging rate of the second liquid crystal display unit, making the second liquid crystal display unit to release a less amount of electrical charges when the first pixel unit 111 is in the state of positive polarity driving. And, when the first pixel unit 111 is in the state of negative polarity driving, the voltage difference between the second pixel electrode of the second liquid crystal display unit and the voltage output terminal 502 of the discharge module 50 is increased in order to increase the discharging rate of the second liquid crystal display unit, making the second liquid crystal display unit to release a larger amount of electrical charges when the first pixel unit 111 is in the state of negative polarity driving.

Figure 4:
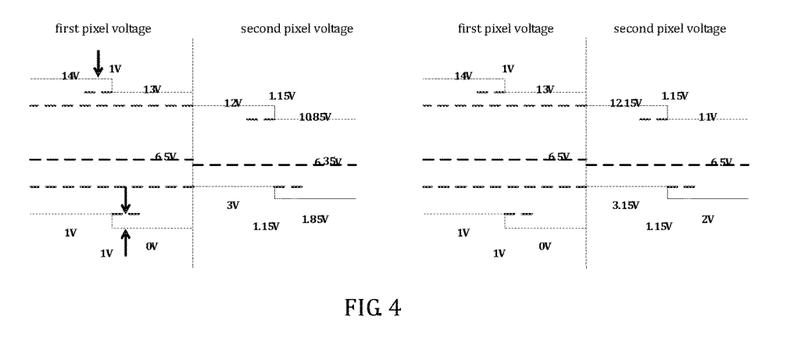
FIG. 4 is a schematic view showing comparison of variation of pixel voltage between the prior art and an embodiment of the present invention.

An example will be provided for illustration. Referring to FIG. 4, FIG. 4 is a schematic view showing comparison of variation of pixel voltage between the prior art and an embodiment of the present invention. The left-hand side of FIG. 4 shows the variation of pixel voltage found in the prior art, and the right-hand side of FIG. 4 shows the variation of pixel voltage in the present invention. As shown in FIG. 4, in the prior art, at a given grey level, the timing controller 40 controls the data line 21 of the data drive chip 20 to supply the driving voltage to the first pixel unit 111. Assuming the driving voltage is 14V in a positive half cycle (this being positive polarity driving) and is 1V in a negative half cycle (this being negative polarity driving), due to influence caused by capacitance coupling, the first pixel voltage is pulled down to 13V (ΔV=1V) in the positive half cycle and 0V (ΔV=1V) in the negative half cycle. Under such a condition, the second liquid crystal display unit must be provided with a common voltage of 6.5V to meet the requirement of no flickering of the image. In the 3T structure, the sub TFT and the shared TFT allow the second liquid crystal display unit to be charged and discharged at the same time and this makes the driving voltage of the second pixel electrode of the second liquid crystal display unit lowered down. Assuming the driving voltage of the second pixel electrode is 12V in the positive half cycle and 3V in the negative half cycle, due to the influence of the capacitance coupling, the second pixel voltage would be pulled down to 10.85V (ΔV=1.15V) in the positive half cycle and 1.85V (ΔV=1.15V) in the negative half cycle. Under this condition, the second liquid crystal display unit must be provided with a common voltage of 6.35V to meet the requirement of no flickering of image. Apparently, the way that is taken in the prior art to discharge would make the common voltages that are necessary for the first liquid crystal display unit and the second liquid crystal display unit different. Since there is just one single common voltage, image flickering would result. The way that the embodiment of the present invention adopts to discharge is such that the level of discharge voltage supplied from the discharge module is increased to make the second pixel electrode to release a less amount of electrical charges in the positive half cycle (namely the driving voltage of the second pixel electrode is increased in the positive half cycle, meaning the driving voltage of the second pixel electrode is increased during positive polarity driving) and to release an increased amount of electrical charges in the negative half cycle (namely the driving voltage of the second pixel electrode is increased in the negative half cycle, meaning the driving voltage of the second pixel electrode is increased during negative polarity driving). The timing controller 40 controls the data line 21 of the data drive chip 20 to supply the driving voltage to the first pixel unit 111, and at the same time, the control terminal of the timing controller 40 supplies a control signal to the control terminal 511 of the discharge module 50. The voltage output terminal 521 of the discharge module 50 supplies a discharge voltage (a first discharge voltage being supplied for the first pixel unit 111 in the state of positive polarity driving and a second discharge voltage being supplied for the state of negative polarity driving). Thus, the driving voltage of the second pixel electrode is 12.15V in the positive half cycle (this being positive polarity driving) and 3.15V in the negative half cycle (this being negative polarity driving). Due to the influence of capacitance coupling, the second pixel voltage would be pulled down to 11V in the positive half cycle and 2V in the negative half cycle. Under this condition, the second liquid crystal display unit must be provided with a common voltage of 6.5V to meet the requirement of no flickering of image. The common voltage required by the second liquid crystal display unit is identical to the common voltage required by the first liquid crystal display unit. Apparently, according to the embodiment of the present invention, in the 3T structure, since the driving voltage of the second pixel electrode is inherently lower than the driving voltage of the first pixel electrode, the voltage drop of the second pixel voltage caused by capacitance coupling is greater than the voltage drop of the first pixel voltage caused by capacitance coupling. The solution adopted in this invention is to increase the driving voltage of the second pixel electrode to compensate or cancel the additional amount of voltage drop of the second pixel electrode caused by capacitance coupling in order to achieve the purpose of setting the common voltage required by the second liquid crystal display unit and the common voltage required by the first liquid crystal display unit to be identical to thereby reducing image flickering and improving displaying performance.

Increasing the driving voltage of the second pixel electrode as adopted in this invention is specifically to increase the discharge voltage supplied from the voltage output terminal 502 of the discharge module 50 to reduce the voltage difference between the second pixel electrode of the second liquid crystal display unit and the voltage output terminal 502 of the discharge module 50 during the first pixel unit 111 being in the state of positive polarity driving so as to reduce the discharging rate of the second liquid crystal display unit and making the second liquid crystal display unit release a less amount of electrical charges when the first pixel unit 111 is in the state of positive polarity driving to thereby increase the driving voltage of the second pixel electrode. During the first pixel unit 111 being in the state of negative polarity driving, the voltage difference between the second pixel electrode of the second liquid crystal display unit and the voltage output terminal 502 of the discharge module 50 is increased to increase the discharging rate of the second liquid crystal display unit so as to make the second liquid crystal display unit release an increased amount of electrical charges when the first pixel unit 111 is in the state of negative polarity driving to thereby increase the driving voltage of the second pixel electrode.

Optionally, the discharge module 50 comprises an RC discharge circuit.

Optionally, the first discharge voltage is equal to the second discharge voltage. For a case that the common voltage is 6.5V, the first discharge voltage and the second discharge voltage can be both set to 7V.

Figure 5:
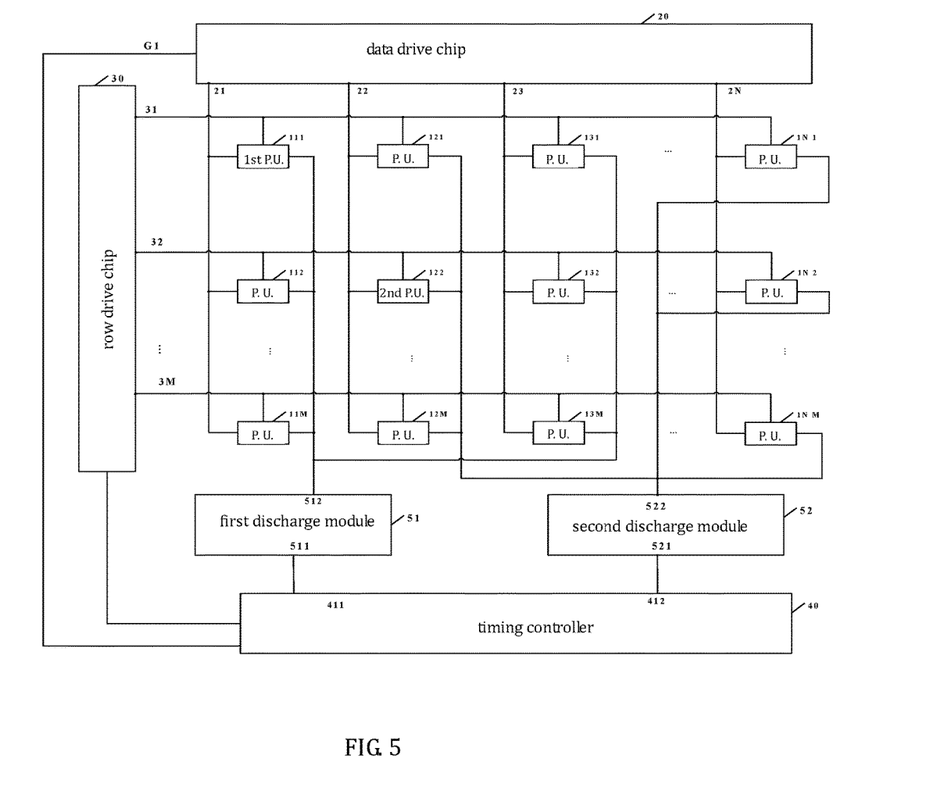
FIG. 5 is a schematic view illustrating a structure of another liquid crystal display of a three thin-film structure disclosed in an embodiment of the present invention.

Referring to FIG. 5, FIG. 5 is a schematic view illustrating a structure of another liquid crystal display of a three TFT structure disclosed in an embodiment of the present invention. As shown in FIG. 5, a liquid crystal display of a three TFT structure described in the instant embodiment comprises arrayed pixel units, a data drive chip 20, a row drive chip 30, a timing controller 40, and a first discharge module 51 and a second discharge module 52. The first discharge module 51 comprises one control terminal 511 and one voltage output terminal 512, and the second discharge module 52 comprises one control terminal 521 and one voltage output terminal 522.

The arrayed pixel units comprise a plurality of pixel units arranged in an array, as shown in FIG. 5. The arrayed pixel units comprises M rows and N columns (for example, M being 768 and N being 1024), and in total M×N pixel units, such as 111, 112, 113, . . . , 11M, 121, 122, 123, . . . , 12M, . . . 1N1, 1N2, 1N3, . . . , 1NM shown in FIG. 5, are involved. The pixel units of the arrayed pixel units all have the same structure and, in the following, the first pixel unit 111 and the second pixel unit 122 are taken as an example for illustration. the first pixel unit 111 comprises a first group of three TFTs, a first liquid crystal display unit LC1, and a second liquid crystal display unit LC2, and the first group of three TFTs comprises a first main TFT (T1), a first sub TFT (T2), and a first shared TFT (T3), wherein the first main TFT (T1) corresponds to the first liquid crystal display unit LC1; the first sub TFT (T2) corresponds to the second liquid crystal display unit LC2. The first pixel unit 111 is or can be regarded as any one of the pixel units included in the arrayed pixel units and following a first way of variation of driving polarity.

The second pixel unit 122 comprises a second group of three TFTs, a third liquid crystal display unit LC3, and a fourth liquid crystal display unit LC4, and the second group of three TFTs comprises a second main TFT (T4), a second sub TFT (T5), and a second shared TFT (T6), wherein the second main TFT (T4) corresponds to a third liquid crystal display unit LC3, the second sub TFT (T5) corresponds to a fourth liquid crystal display unit LC4. The second pixel unit 122 is or can be regarded as any one of the pixel units included in the arrayed pixel units and following a second way of variation of driving polarity, wherein the first way of variation of driving polarity is opposite to the second way of variation of driving polarity.

The control terminal 511 of the first discharge module 51 is connected to the control terminal 41 of the timing controller 40, and the control terminal 521 of the second discharge module 52 is connected to the control terminal 42 of the timing controller 40.

Figure 6:
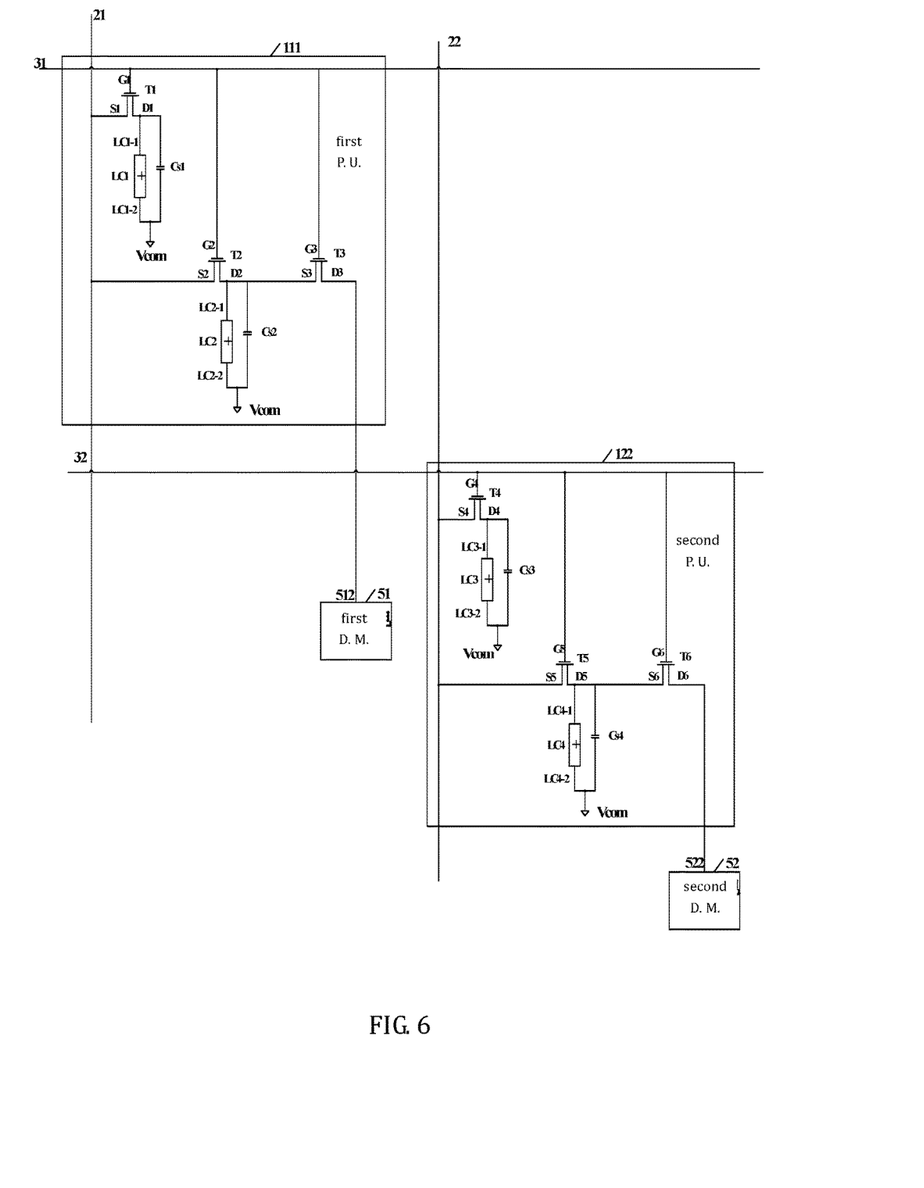
FIG. 6 is a schematic view illustrating a specific structure of another pixel unit disclosed in an embodiment of the present invention.

FIG. 6 is a schematic view illustrating a specific structure of another pixel unit disclosed in an embodiment of the present invention, and the first pixel unit 111 and the second pixel unit 122 shown in FIG. 5 are taken as an example of expounding the specific structure of pixel units shown in FIG. 6. As shown in FIG. 6, a first gate line 31 of the row drive chip 30 is connected to a gate electrode G1 of the first main TFT (T1), a gate electrode G2 of the first sub TFT (T2), and a gate electrode G3 of the first shared TFT (T3); a first data line 21 of the data drive chip 20 is connected to a source electrode S1 of the first main TFT (T1) and a source electrode S2 of the first sub TFT (T2). A drain electrode D1 of the first main TFT (T1) is connected to a first terminal LC1-1 of the first liquid crystal display unit LC1, and the first terminal LC1-1 of the first liquid crystal display unit LC1 serves as a first pixel electrode; and a drain electrode D2 of the first sub TFT (T2) is connected to a first terminal LC2-1 of the second liquid crystal display unit LC2 and the first terminal LC2-1 of the second liquid crystal display unit LC2 serves as a second pixel electrode. A second terminal LC1-2 of the first liquid crystal display unit LC1 and a second terminal LC2-2 of the second liquid crystal display unit LC2 are connected to a common electrode, wherein a voltage of the common electrode is referred to as a common electrode voltage (Vcom), which is also referred to as "common voltage". A source electrode S3 of the first shared TFT (T3) is connected to the first terminal LC2-1 of the second liquid crystal display unit LC2, and a drain electrode D3 of the first shared TFT (T3) is connected to the voltage output terminal 512 of the first discharge module 51. The first liquid crystal display unit LC1 and the second liquid crystal display unit LC2 can each be regarded as "liquid crystal molecules", and applying a voltage to two ends of the liquid crystal molecules would form a liquid crystal capacitor. Thus, when a voltage is applied the first liquid crystal display unit LC1 and the second liquid crystal display unit LC2, the first liquid crystal display unit LC1 and the second liquid crystal display unit LC2 can be regarded as a liquid crystal capacitor. Also, the first liquid crystal display unit LC1 and the second liquid crystal display unit LC2 are connected, with two ends thereof, in parallel to a first storage capacitor Cs1 and a second storage capacitor Cs2 in order to maintain stability of voltage between two ends of the liquid crystal molecules during a time period of displaying a frame of image.

A second gate line 22 of the row drive chip 20 is connected to a gate electrode G4 of the second main TFT (T4), a gate electrode G5 of the second sub TFT (T2), and a gate electrode G6 of the second shared TFT (T6); a second data line 22 of the data drive chip 20 is connected to a source electrode of the second main TFT (T4) and a source electrode of the second sub TFT. A drain electrode D4 of second first main TFT (T4) is connected to a first terminal LC3-1 of the third liquid crystal display unit LC3; and a drain electrode D5 of the second sub TFT (T5) is connected to a first terminal LC4-1 of the fourth liquid crystal display unit LC4. A second terminal LC3-2 of the third liquid crystal display unit LC3 and a second terminal LC4-2 of the fourth liquid crystal display unit LC4 are connected to the above common electrode. A source electrode S6 of the second shared TFT (T6) is connected to the first terminal LC4-1 of the fourth liquid crystal display unit LC4, and a drain electrode of the second shared TFT (T6) is connected to the voltage output terminal 522 of the second discharge module 52.

The row drive chip 30 is operable to turn on, via the first gate line 31, the first main TFT (T1), the first sub TFT (T2), and the first shared TFT (T3). The data drive chip 20 is operable to charge, via the first data line 21, the first liquid crystal display unit LC1 corresponding to the first main TFT (T1) and the second liquid crystal display unit LC2 corresponding to the first sub TFT (T2) when the first main TFT (T1) and the first sub TFT (T2) are turned on. When the first shared TFT (T3) is turned on, the first shared TFT (T3) allows the second liquid crystal display unit LC2 to discharge by means of the first discharge module 51.

The row drive chip 30 is operable to turn on, via the second gate line 31, the second main TFT (T4), the second sub TFT (T5), and the second shared TFT (T6). The data drive chip 20 is operable to charge, via the second data line 22, the third liquid crystal display unit LC3 corresponding to the second main TFT (T4) and the fourth liquid crystal display unit LC4 corresponding to the second sub TFT (T5) when the second main TFT (T4) and the second sub TFT (T5) are turned on. When the second shared TFT (T6) is turned on, the second shared TFT (T6) allows the fourth liquid crystal display unit LC4 to discharge by means of the second discharge module 52.

The voltage output terminal 512 of the first discharge module 51 supplies a first discharge voltage V+ when the first pixel unit 111 is in a state of positive polarity driving and supplies a second discharge voltage V− when the first pixel unit 111 is in a state of negative polarity driving. The first discharge voltage V+ and the second discharge voltage V− are both greater than the common electrode voltage Vcom.

The voltage output terminal 522 of the second discharge module 52 supplies a first discharge voltage V+ when the second pixel unit 122 is in a state of positive polarity driving and supplies a second discharge voltage V− when the second pixel unit 122 is in a state of negative polarity driving.

Figure 7:
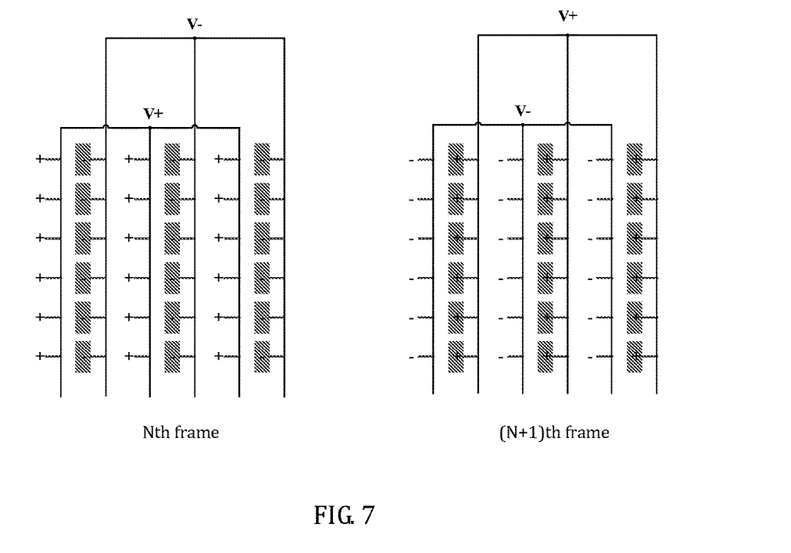
FIG. 7 is a schematic view illustrating one way of discharging of positive and negative frames disclosed in an embodiment of the present invention.

Optionally, the arrayed pixel units are driven in a column inversion fashion. Referring to FIG. 7, FIG. 7 is a schematic view illustrating one way of discharging of positive and negative frames disclosed in an embodiment of the present invention. Each of the pixel units included in the arrayed pixel units is subjected to change of the polarity thereof when supplied with next, better image data. In other words, the polarity of each of the pixel units included in the arrayed pixel units changes at the time when the image is refreshed. Taking a refresh frequency of 60 Hz as an example, the polarity of the image is changed one time for each time interval of 16 ms. In other words, for the same pixel unit, the polarity is constantly changed. When the arrayed pixel units is driven in the column inversion fashion, the pixel units of two adjacent columns of the arrayed pixel units have opposite polarities, while the pixel units in the same column has the same polarity. Referring to FIG. 7, there are only six (6) columns of pixel units shown in FIG. 7, in which in displaying an image of an Nth frame, the pixel units of the first, third, and fifth columns are of the same polarity, which is shown as positive polarity, wherein the pixel units of the first, third, and fifth columns are all connected to the first discharge module 51 and at the moment, the voltage output terminal 512 of the first discharge module 51 supplies the first discharge voltage V+; and the pixel units of the second, fourth, and sixth columns are of the same polarity, which is shown as negative polarity, wherein the pixel units of the second, fourth, and sixth columns are all connected to the second discharge module 52 and at the moment, the voltage output terminal 522 of the second discharge module 52 supplies the second discharge voltage V−. In displaying an image of an (N+1)th frame, the polarity of the pixel units of the first, third, and fifth columns are changed and are all changed to negative polarity, wherein the pixel units of the first, third, and fifth columns are all connected to the first discharge module 51 and at the moment, the voltage output terminal 512 of the first discharge module 51 supplies the second discharge voltage V−; and the pixel units of the second, fourth, and sixth columns are similarly changed and are all changed to positive polarity, wherein the pixel units of the second, fourth, and sixth columns are all connected to the second discharge module 52 and at the moment, the voltage output terminal 522 of the second discharge module 52 supplies the first discharge voltage V+. When the arrayed pixel units are driven in the column inversion fashion, two discharge modules are sufficient to control discharging from the arrayed pixel units, wherein each of the discharge modules includes just one single voltage output terminal so that the number of the voltage output terminals involved is reduced. The same effect as that achieved with the arrangement of FIG. 1 can be provided, simply based on the simplified circuit structure.

Figure 8:
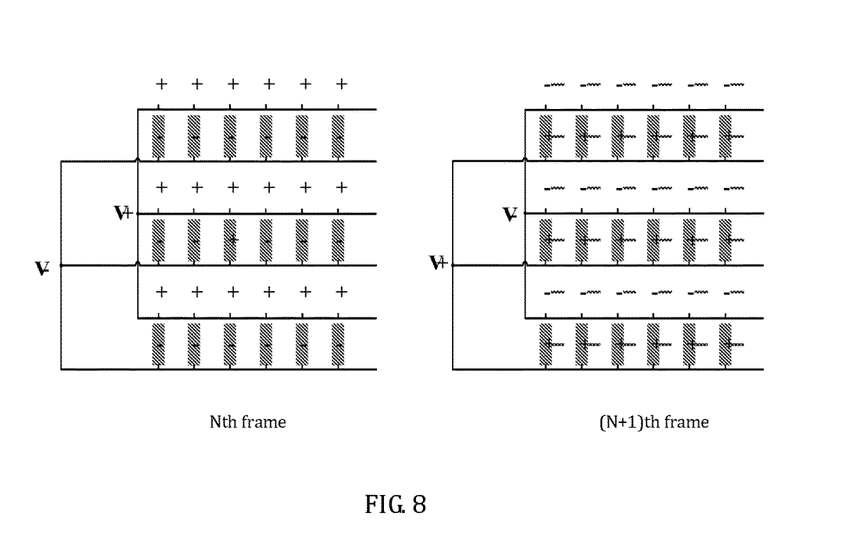
FIG. 8 is a schematic view illustrating another way of discharging of positive and negative frames disclosed in an embodiment of the present invention.

Optionally, the arrayed pixel units are driven in a row inversion fashion. Referring to FIG. 8, FIG. 8 is a schematic view illustrating another way of discharging of positive and negative frames disclosed in an embodiment of the present invention. Each of the pixel units included in the arrayed pixel units is subjected to change of the polarity thereof when supplied with next, better image data. In other words, the polarity of each of the pixel units included in the arrayed pixel units changes at the time when the image is refreshed. Taking a refresh frequency of 60 Hz as an example, the polarity of the image is changed one time for each time interval of 16 ms. In other words, for the same pixel unit, the polarity is constantly changed. When the arrayed pixel units is driven in the row inversion fashion, the pixel units of two adjacent rows of the arrayed pixel units have opposite polarities, while the pixel units in the same row has the same polarity. Referring to FIG. 8, there are only six (6) rows of pixel units shown in FIG. 8, in which in displaying an image of an Nth frame, the pixel units of the first, third, and fifth rows are of the same polarity, which is shown as positive polarity, wherein the pixel units of the first, third, and fifth rows are all connected to the first discharge module 51 and at the moment, the voltage output terminal 512 of the first discharge module 51 supplies the first discharge voltage V+; and the pixel units of the second, fourth, and sixth rows are of the same polarity, which is shown as negative polarity, wherein the pixel units of the second, fourth, and sixth rows are all connected to the second discharge module 52 and at the moment, the voltage output terminal 522 of the second discharge module 52 supplies the second discharge voltage V−. In displaying an image of an (N+1)th frame, the polarity of the pixel units of the first, third, and fifth rows are changed and are all changed to negative polarity, wherein the pixel units of the first, third, and fifth rows are all connected to the first discharge module 51 and at the moment, the voltage output terminal 512 of the first discharge module 51 supplies the second discharge voltage V−; and the pixel units of the second, fourth, and sixth rows are similarly changed and are all changed to positive polarity, wherein the pixel units of the second, fourth, and sixth rows are all connected to the second discharge module 52 and at the moment, the voltage output terminal 522 of the second discharge module 52 supplies the first discharge voltage V+. When the arrayed pixel units are driven in the row inversion fashion, two discharge modules are sufficient to control discharging from the arrayed pixel units, wherein each of the discharge modules includes just one single voltage output terminal so that the number of the voltage output terminals involved is reduced. The same effect as that achieved with the arrangement of FIG. 1 can be provided, simply based on the simplified circuit structure.

Figure 9:
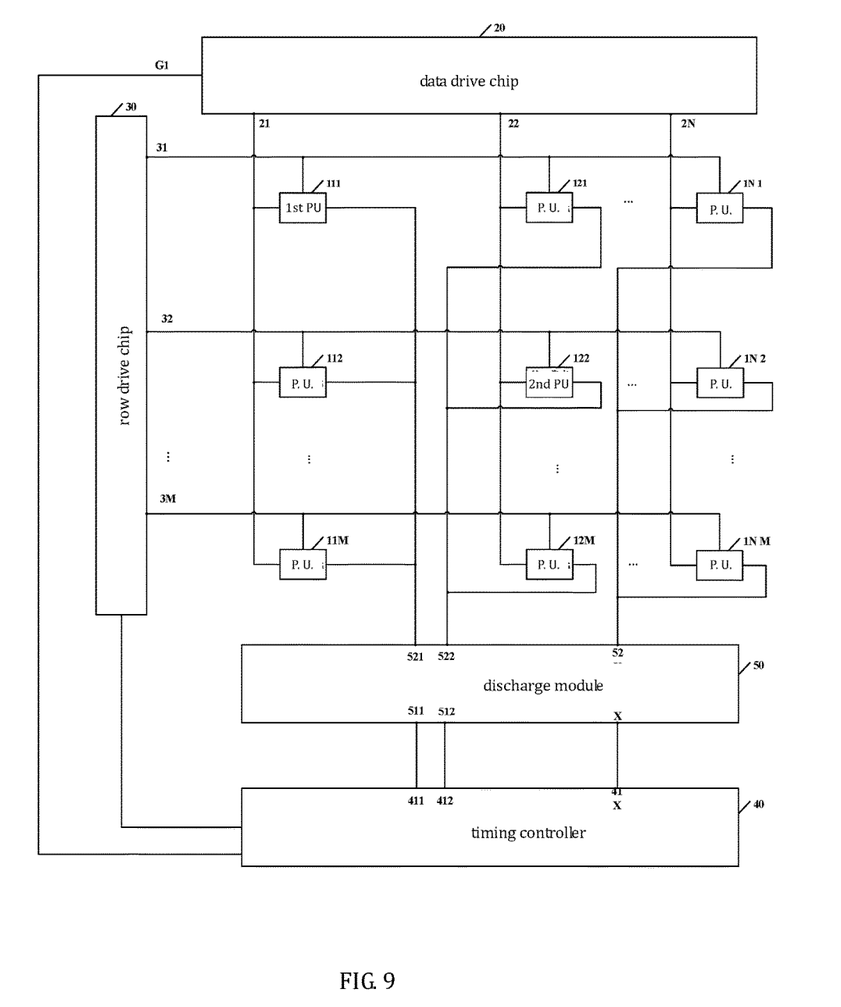
FIG. 9 is a schematic view illustrating a structure of a further liquid crystal display of a three thin-film transistor structure disclosed in an embodiment of the present invention.
Figure 10:
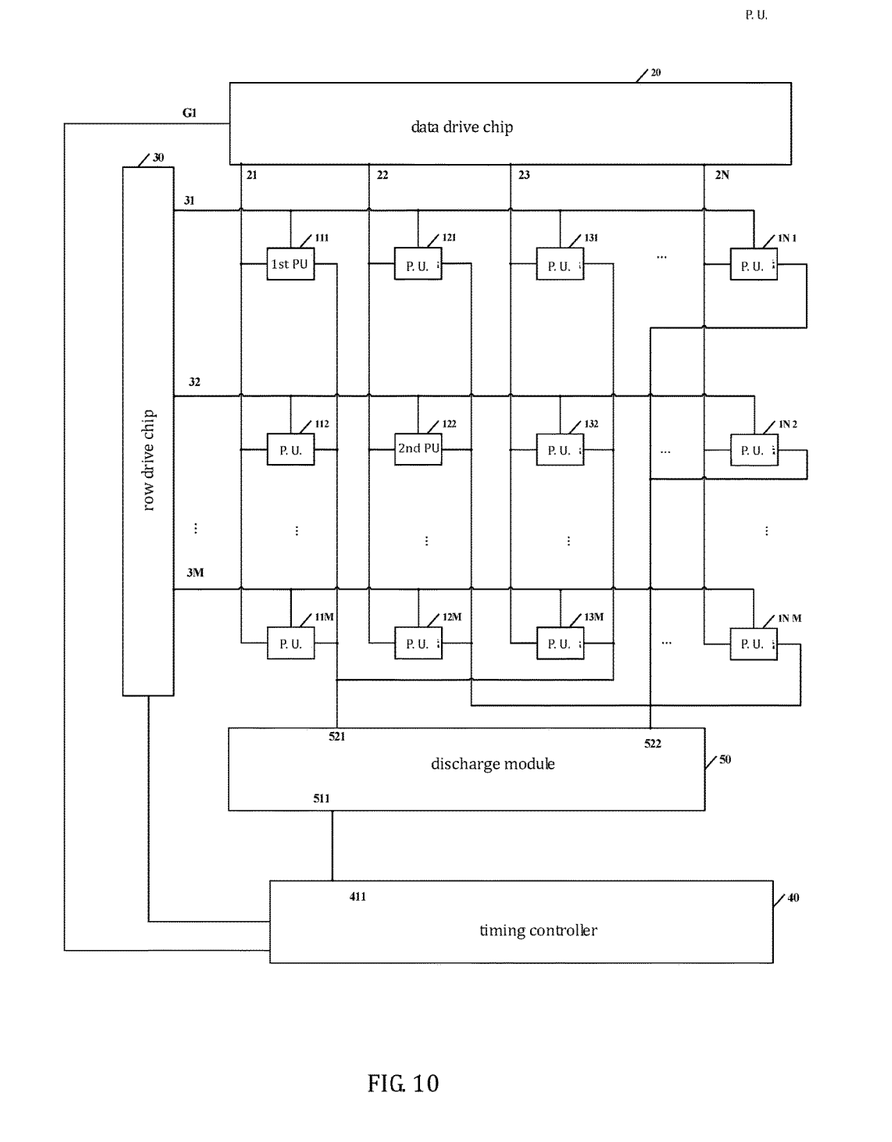
FIG. 10 is a schematic view illustrating a structure of yet a further liquid crystal display of a three thin-film transistor structure disclosed in an embodiment of the present invention.

Optionally, the liquid crystal display of the three TFT structure shown in FIG. 5 may have modified arrangements as shown in FIGS. 9 and 10. In FIG. 9, one single discharge module 50 is involved, where the discharge module 50 comprises a plurality of control terminals (511, 512, . . . , 51X) and a plurality of voltage output terminals (521, 522, . . . , 52X), and this is sufficient to achieve discharging of all the pixel units included in the arrayed pixel units. The arrangement of FIG. 9 involves just one single discharge module to achieve discharging of all the pixel units included in the arrayed pixel units and thus, the number of discharge module involved is reduced, the circuit structure is simplified, and the circuit cost is reduced.

Optionally, the first discharge module 51 and the second discharge module 52 may each comprise an RC discharge circuit.

Optionally, the first discharge voltage is equal to the second discharge voltage. For a case that the common voltage is 6.5V, the first discharge voltage and the second discharge voltage can be both set to 7V.

In FIG. 10, one single discharge module 50 is involved, where the discharge module 50 comprise just one control terminal 511 and two voltage output terminals 521, 522, and this is sufficient to achieve discharging of all the pixel units included in the arrayed pixel units. On the basis of the arrangement shown in FIG. 1, the number of voltage output terminal involved is reduced; the number of discharge module involved is reduced; and the circuit structure is simplified.

The above provides a detailed description of a liquid crystal display of a three TFT structure and a display device according to embodiments of the present invention. Specific examples are used in the specification to expound the principle and embodying ways of the present invention. The description of the embodiments is provided to help understanding of the method of the present invention, as well as the essential idea thereof. Further, for those having ordinary skills in the art, it can be contemplated to make modifications, based on the idea of the present invention, on the embodiments and applications thereof. In conclusion, the specification should not be interpreted as constraint to the scope of the present invention.

What is claimed is:

1. A liquid crystal display of a three thin-film transistor (TFT) structure, comprising arrayed pixel units, a data drive chip, a row drive chip, a timing controller, and a discharge module, the discharge module comprising a plurality of control terminals and a plurality of voltage output terminals, the plurality of control terminals of the discharge module being respectively connected to a plurality of control terminals of the timing controller;

wherein the first pixel unit comprises three TFTs, a first liquid crystal display unit, and a second liquid crystal display unit, the three TFTs including a main TFT, a sub TFT, and a shared TFT, the main TFT corresponding to the first liquid crystal display unit, the sub TFT corresponding to the second liquid crystal display unit; the first pixel unit is one of the pixel units included in the arrayed pixel units;

wherein a gate line of the row drive chip is connected to a gate electrode of the main TFT, a gate electrode of the sub TFT, and a gate electrode of the shared TFT; a data line of the data drive chip is connected to a source electrode of the main TFT and a source electrode of the sub TFT; a drain electrode of the main TFT is connected to a first terminal of the first liquid crystal display unit; a drain electrode of the sub TFT is connected to a first terminal of the second liquid crystal display unit; a second terminal of the first liquid crystal display unit and a second terminal of the second liquid crystal display unit are connected to a common electrode; a source electrode of the shared TFT is connected to the first terminal of the second liquid crystal display unit; a drain electrode of the shared TFT is connected to one voltage output terminal of the discharge module;

wherein the row drive chip is operable to turn on, via the gate line, the main TFT, the sub TFT, and the shared TFT; the data drive chip is operable to charge, via the data line, the first liquid crystal display unit corresponding to the main TFT and the second liquid crystal display unit corresponding to the sub TFT when the main TFT and the sub TFT are turned on; and when the shared TFT is turned on, the shared TFT allows the second liquid crystal display unit to discharge by means of the discharge module; and wherein the voltage output terminal of the discharge module supplies a first discharge voltage when the first pixel unit is in a state of positive polarity driving and supplies a second discharge voltage when the first pixel unit is in a state of negative polarity driving; the first discharge voltage and the second discharge voltage are both greater than a voltage of the common electrode.

2. The liquid crystal display as claimed in claim 1, wherein the discharge module comprises an RC discharge circuit.

3. The liquid crystal display as claimed in claim 2, wherein the first discharge voltage is equal to the second discharge voltage.

4. The liquid crystal display as claimed in claim 1, wherein the first discharge voltage is equal to the second discharge voltage.

5. A liquid crystal display of a three thin-film transistor (TFT) structure, comprising arrayed pixel units, a data drive chip, a row drive chip, a timing controller, a first discharge module, and a second discharge module;

wherein the first pixel unit comprises a first group of three TFTs, a first liquid crystal display unit, and a second liquid crystal display unit, the first group of three TFTs including a first main TFT, a first sub TFT, and a first shared TFT, the first main TFT corresponding to the first liquid crystal display unit, the first sub TFT corresponding to the second liquid crystal display unit; the first pixel unit is one of the pixel units included in the arrayed pixel units and following a first way of variation of driving polarity;

wherein the second pixel unit comprises a second group of three TFTs, a third liquid crystal display unit, and a fourth liquid crystal display unit, the second group of three TFTs including a second main TFT, a second sub TFT, and a second shared TFT, the second main TFT corresponding to the third liquid crystal display unit, the second sub TFT corresponding to the fourth liquid crystal display unit; the second pixel unit is one of the pixel units included in the arrayed pixel units and following a second way of variation of driving polarity;

wherein a first gate line of the row drive chip is connected to a gate electrode of the first main TFT, a gate electrode of the first sub TFT, and a gate electrode of the first shared TFT; a first data line of the data drive chip is connected to a source electrode of the first main TFT and a source electrode of the first sub TFT; a drain electrode of the first main TFT is connected to a first terminal of the first liquid crystal display unit; a drain electrode of the first sub TFT is connected to a first terminal of the second liquid crystal display unit; a second terminal of the first liquid crystal display unit and a second terminal of the second liquid crystal display unit are connected to a common electrode; a source electrode of the first shared TFT is connected to the first terminal of the second liquid crystal display unit; a drain electrode of the first shared TFT is connected to one voltage output terminal of the first discharge module;

wherein a second gate line of the row drive chip is connected to a gate electrode of the second main TFT, a gate electrode of the second sub TFT, and a gate electrode of the second shared TFT; a second data line of the data drive chip is connected to a source electrode of the second main TFT and a source electrode of the second sub TFT; a drain electrode of the second main TFT is connected to a first terminal of the third liquid crystal display unit; a drain electrode of the second sub TFT is connected to a first terminal of the fourth liquid crystal display unit; a second terminal of the third liquid crystal display unit and a second terminal of the fourth liquid crystal display unit are connected to the common electrode; a source electrode of the second shared TFT is connected to the first terminal of the fourth liquid crystal display unit; a drain electrode of the second shared TFT is connected to the voltage output terminal of the second discharge module;

wherein the row drive chip is operable to turn on, via the first gate line, the first main TFT, the first sub TFT, and the first shared TFT; the data drive chip is operable to charge, via the first data line, the first liquid crystal display unit corresponding to the first main TFT and the second liquid crystal display unit corresponding to the first sub TFT when the first main TFT and the first sub TFT are turned on; when the first shared TFT is turned on, the first shared TFT allows the second liquid crystal display unit to discharge by means of the first discharge module;

wherein the row drive chip is operable to turn on, via the second gate line, the second main TFT, the second sub TFT, and the second shared TFT; the data drive chip is operable to charge, via the second data line, the third liquid crystal display unit corresponding to the second main TFT and the fourth liquid crystal display unit corresponding to the second sub TFT when the second main TFT and the second sub TFT are turned on; when the second shared TFT is turned on, the second shared TFT allows the fourth liquid crystal display unit to discharge by means of the second discharge module;

wherein the voltage output terminal of the first discharge module supplies a first discharge voltage when the first pixel unit is in a state of positive polarity driving and supplies a second discharge voltage when the first pixel unit is in a state of negative polarity driving; the first discharge voltage and the second discharge voltage are both greater than the common electrode voltage;

wherein the voltage output terminal of the second discharge module supplies the first discharge voltage when the second pixel unit is in a state of positive polarity driving and supplies the second discharge voltage when the second pixel unit is in a state of negative polarity driving.

6. The liquid crystal display as claimed in claim 5, wherein the arrayed pixel units are driven in a column inversion fashion.

7. The liquid crystal display as claimed in claim 6, wherein the first discharge module comprises an RC discharge circuit, and the second discharge module comprises an RC discharge circuit.

8. The liquid crystal display as claimed in claim 7, wherein the first discharge voltage is equal to the second discharge voltage.

9. The liquid crystal display as claimed in claim 5, wherein the arrayed pixel units are driven in a row inversion fashion.

10. The liquid crystal display as claimed in claim 9, wherein the first discharge module and the second discharge module both comprise an RC discharge circuit.

11. The liquid crystal display as claimed in claim 10, wherein the first discharge voltage is equal to the second discharge voltage.

12. The liquid crystal display as claimed in claim 5, wherein the first discharge module comprises an RC discharge circuit, and the second discharge module comprises an RC discharge circuit.

13. The liquid crystal display as claimed in claim 5, wherein the first discharge voltage is equal to the second discharge voltage.

14. A display device, comprising a liquid crystal display of a three thin-film transistor (TFT) structure, wherein the liquid crystal display comprises arrayed pixel units, a data drive chip, a row drive chip, a timing controller, a first discharge module, and a second discharge module;

wherein the first pixel unit comprises a first group of three TFTs, a first liquid crystal display unit, and a second liquid crystal display unit, the first group of three TFTs including a first main TFT, a first sub TFT, and a first shared TFT, the first main TFT corresponding to the first liquid crystal display unit, the first sub TFT corresponding to the second liquid crystal display unit; the first pixel unit is one of the pixel units included in the arrayed pixel units and following a first way of variation of driving polarity;

wherein the second pixel unit comprises a second group of three TFTs, a third liquid crystal display unit, and a fourth liquid crystal display unit, the second group of three TFTs including a second main TFT, a second sub TFT, and a second shared TFT, the second main TFT corresponding to the third liquid crystal display unit, the second sub TFT corresponding to the fourth liquid crystal display unit; the second pixel unit is one of the pixel units included in the arrayed pixel units and following a second way of variation of driving polarity;

wherein a first gate line of the row drive chip is connected to a gate electrode of the first main TFT, a gate electrode of the first sub TFT, and a gate electrode of the first shared TFT; a first data line of the data drive chip is connected to a source electrode of the first main TFT and a source electrode of the first sub TFT; a drain electrode of the first main TFT is connected to a first terminal of the first liquid crystal display unit; a drain electrode of the first sub TFT is connected to a first terminal of the second liquid crystal display unit; a second terminal of the first liquid crystal display unit and a second terminal of the second liquid crystal display unit are connected to a common electrode; a source electrode of the first shared TFT is connected to the first terminal of the second liquid crystal display unit; a drain electrode of the first shared TFT is connected to one voltage output terminal of the first discharge module;

wherein a second gate line of the row drive chip is connected to a gate electrode of the second main TFT, a gate electrode of the second sub TFT, and a gate electrode of the second shared TFT; a second data line of the data drive chip is connected to a source electrode of the second main TFT and a source electrode of the second sub TFT; a drain electrode of the second main TFT is connected to a first terminal of the third liquid crystal display unit; a drain electrode of the second sub TFT is connected to a first terminal of the fourth liquid crystal display unit; a second terminal of the third liquid crystal display unit and a second terminal of the fourth liquid crystal display unit are connected to the common electrode; a source electrode of the second shared TFT is connected to the first terminal of the fourth liquid crystal display unit; a drain electrode of the second shared TFT is connected to the voltage output terminal of the second discharge module;

wherein the row drive chip is operable to turn on, via the first gate line, the first main TFT, the first sub TFT, and the first shared TFT; the data drive chip is operable to charge, via the first data line, the first liquid crystal display unit corresponding to the first main TFT and the second liquid crystal display unit corresponding to the first sub TFT when the first main TFT and the first sub TFT are turned on; when the first shared TFT is turned on, the first shared TFT allows the second liquid crystal display unit to discharge by means of the first discharge module;

wherein the row drive chip is operable to turn on, via the second gate line, the second main TFT, the second sub TFT, and the second shared TFT; the data drive chip is operable to charge, via the second data line, the third liquid crystal display unit corresponding to the second main TFT and the fourth liquid crystal display unit corresponding to the second sub TFT when the second main TFT and the second sub TFT are turned on; when the second shared TFT is turned on, the second shared TFT allows the fourth liquid crystal display unit to discharge by means of the second discharge module;

wherein the voltage output terminal of the first discharge module supplies a first discharge voltage when the first pixel unit is in a state of positive polarity driving and supplies a second discharge voltage when the first pixel unit is in a state of negative polarity driving; the first discharge voltage and the second discharge voltage are both greater than the common electrode voltage;

wherein the voltage output terminal of the second discharge module supplies the first discharge voltage when the second pixel unit is in a state of positive polarity driving and supplies the second discharge voltage when the second pixel unit is in a state of negative polarity driving.

15. The display device as claimed in claim 14, wherein the arrayed pixel units are driven in a column inversion fashion or a row inversion fashion.

16. The display device as claimed in claim 14, wherein the first discharge module and the second discharge module both comprise an RC discharge circuit.

17. The display device as claimed in claim 14, wherein the first discharge voltage is equal to the second discharge voltage.

\* \* \* \* \*